United States Patent

[11] 3,628,041

[72] Inventors: Donald L. Cummins; Morris Esche; Robert W. Campbell, all of Anderson, Ind.
[21] Appl. No.: 91,682
[22] Filed: Nov. 23, 1970
[45] Patented: Dec. 14, 1971
[73] Assignee: General Motors Corporation, Detroit, Mich.

[54] ELECTRIC CRANKING MOTOR AUTOMATIC DISCONNECT AND LOCKOUT CIRCUIT
4 Claims, 1 Drawing Fig.

[52] U.S. Cl. .................................................. 290/37, 290/38
[51] Int. Cl. .................................................. F02n 11/00
[50] Field of Search .................................. 290/37, 38, 36; 123/17 BG

[56] References Cited
UNITED STATES PATENTS
3,530,846  9/1970  Bean ........................... 290/38 X
3,514,621  5/1970  Farmar ......................... 290/38 X Primary Examiner—G. R. Simmons
Attorneys—Eugene W. Christen, Creighton R. Meland and Richard G. Stahr ABSTRACT: An electric cranking motor automatic disconnect and lockout circuit. The normally open contacts of a cranking motor solenoid operated switch are connected in series with the electric cranking motor across a source of direct current supply potential. Upon the closure of an electric switch, the source of direct current supply potential, applied across the gate-cathode electrodes of a first silicon controlled rectifier, triggers this device conductive through the anode-cathode electrodes to establish a circuit for base-emitter current flow through a first transistor. The conductive first transistor establishes an energizing circuit for the operating coil of an electric relay which, in turn, establishes an energizing circuit for the operating coil of the solenoid operated switch. The output potential of an electrical generator driven by the cranking motor armature is applied across the gate-cathode electrodes of a second silicon controlled rectifier. When the generator output potential is of sufficient magnitude to produce gate-cathode current through the second silicon controlled rectifier, the resulting anode-cathode current flow therethrough shunts base current from the first transistor to extinguish this device, thereby interrupting the energizing circuit for the operating coil of the electric relay and, in turn, the solenoid operated switch to provide automatic disconnect of the cranking motor upon engine start. A vibration transducer mounted upon the cranked engine produces an alternating current potential signal which triggers a second transistor conductive to shunt gate current from the first silicon controlled rectifier thereby preventing the retriggering of the first transistor while the engine is running to provide a lockout of the cranking motor.

Patented Dec. 14, 1971
3,628,041
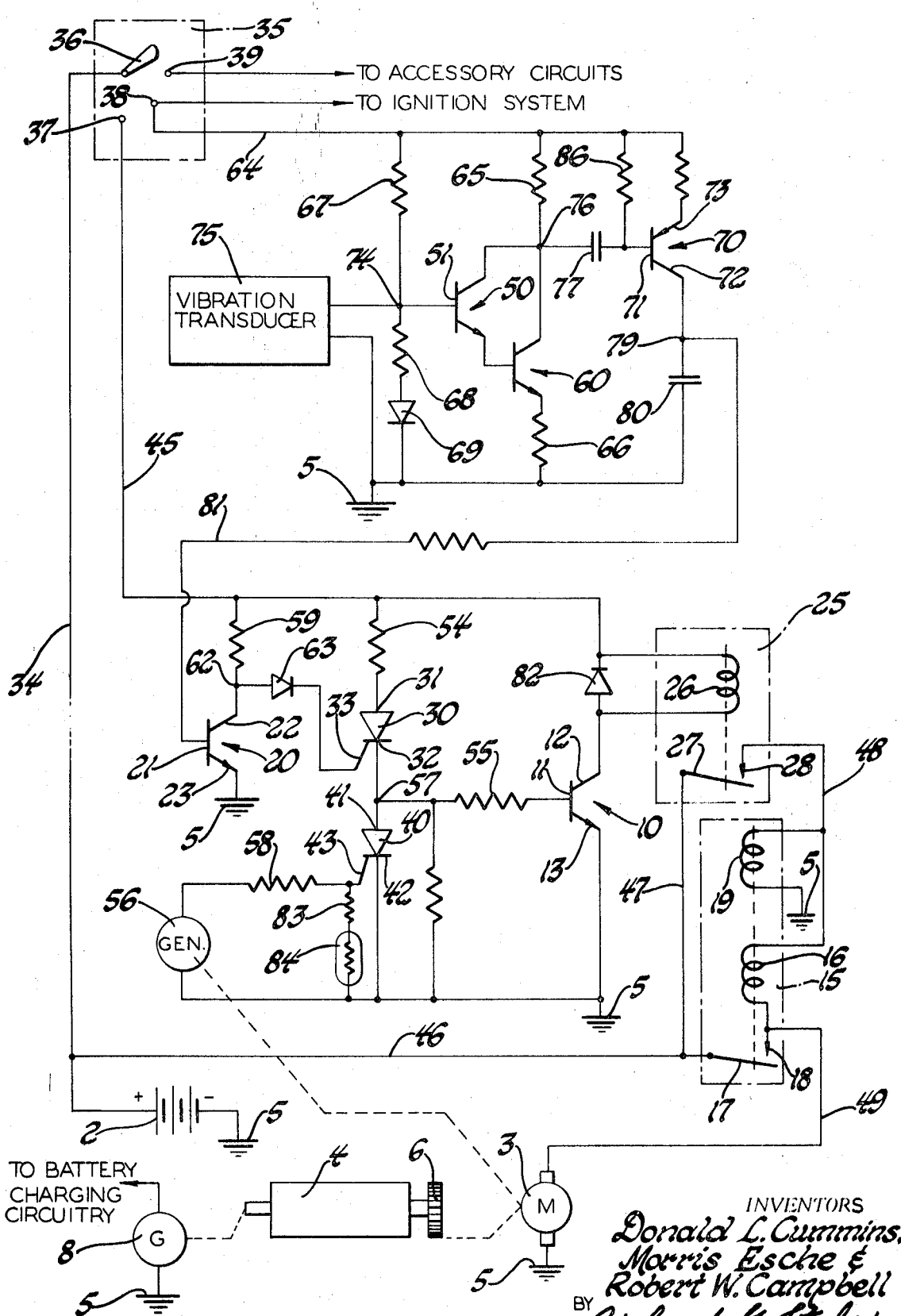
INVENTORS
Donald L. Cummins,
Morris Esche &
Robert W. Campbell
BY Richard G. Stahr
ATTORNEY

ELECTRIC CRANKING MOTOR AUTOMATIC DISCONNECT AND LOCKOUT CIRCUIT

This invention is directed to an electric cranking motor automatic disconnect and lockout circuit and, more specifically, to a circuit of this type which is responsive to an electrical control potential of a magnitude which increases with the speed of the cranked engine to automatically interrupt the cranking motor energizing circuit upon engine "start" and to prevent the reenergization thereof while the engine is in the running mode.

Electric cranking motors are frequently employed to start internal combustion engines which are used as a power source for a variety of applications. To prevent serious damage to the engine, the cranking motor and the cranking motor engagement mechanism, it is mandatory that the cranking motor be deenergized upon engine "start." It is equally important that the cranking motor be not energized while the engine is in the running mode.

Therefore, a circuit which will automatically deenergize the cranking motor upon engine "start" and which will prevent the reenergization of the cranking motor while the engine is in the running mode is desirable.

It is, therefore, an object of this invention to provide an improved electric cranking motor automatic disconnect and lockout circuit.

It is another object of this invention to provide an improved electric cranking motor automatic disconnect and lockout circuit which is responsive to an electrical control potential of a magnitude which increases with the speed of the cranked engine to interrupt the cranking motor energizing circuit upon engine "start" and to prevent the reestablishment thereof while the engine is in the running mode.

In accordance with this invention, an electric cranking motor automatic disconnect and lockout circuit is provided wherein the energizing circuit for the operating coil of the cranking motor solenoid operated switch is interrupted by the contacts of a relay having an operating coil energized through the collector-emitter electrodes of a first transistor when the first transistor is extinguished in response to an electrical control potential, of a magnitude which increases with the speed of the cranked engine, reaching a sufficient magnitude to trigger a silicon controlled rectifier conductive through the anode-cathode electrodes to shunt base current from the first transistor, and gate current is shunted from another silicon controlled rectifier through which base current is supplied to the first transistor by a second transistor responsive to an alternating current electrical signal produced upon engine start by a vibration transducer mounted upon the cranked engine.

For a better understanding of the present invention, together with additional objects, advantages and features thereof, reference is made to the following description and accompanying single FIGURE drawing which sets forth the electric cranking motor automatic disconnect and lockout circuit of this invention in schematic form.

As point of reference or ground potential is the same point electrically throughout the system, it has been illustrated by the accepted symbol and referenced by the numeral 5 in the FIGURE.

Referring to the FIGURE, the electric cranking motor automatic disconnect and lockout circuit of this invention is set forth in schematic form in combination with a source of direct current supply potential, which may be a conventional storage battery 2, an electric cranking motor 3 connected thereacross through the normally open contacts of a cranking motor solenoid operated switch 15 having at least one operating coil 16 and two normally open contacts, movable contact 17 and stationary contact 18 and an associated internal combustion engine 4 cranked thereby and includes an electric relay 25 having an operating coil 26 and a movable contact 27 and a stationary contact 28, two type NPN-transistor 10 and 20 each having a control electrode and two current carrying electrodes and two silicon controlled rectifiers 30 and 40 each having anode, cathode and gate electrodes.

As conventional electric cranking motors and internal combustion engines are well-known in the art and, per se, form no part of this invention, in the interest of reducing drawing complexity, each has been symbolically represented in the FIGURE. Cranking motor 3 may be drivably engaged with gear 6 of engine 4 through any method well known in the automotive art.

The cranking motor solenoid operated switch 15, hereinafter referred to as a solenoid operated switch, is shown in the FIGURE to have two coils 16 and 19. This is a common expedient, particularly in the automotive art, for the purpose of conserving battery power. Coil 16 is the operating or "pull-in" coil which, when energized, closes movable contact 17 to stationary contact 18 and coil 19 is a "hold-in" coil which maintains movable contact 17 in electrical contact with stationary contact 18 after "pull-in" coil 16 is "shorted out" by the closed contacts. It is to be specifically understood that a solenoid operated switch having only one coil may be used without departing from the spirit of the invention.

Operating coil 26 of electric relay 25 is connected across the source of direct current supply potential through the current carrying electrodes of type NPN-transistor 10. This energizing circuit may be traced from the positive polarity terminal of battery 2, through lead 34, movable contact 36 and stationary contact 37 of electric switch 35, lead 45, operating coil 26 of relay 25, the collector electrode 12 and emitter electrode 13 of type NPN-transistor 10 and point of reference or ground potential 5 to the negative polarity terminal of battery 2.

The electric switch 35 may be a conventional automotive type ignition switch having an open or "off" position, in which it is shown in the FIGURE, a "run" position at which movable contact 36 is closed to stationary contacts 38 and 39 and a "crank" position at which movable contact 36 is closed to stationary contacts 37 and 38. As is well-known in the art, switches of this type are spring biased to automatically return to the "run" position wherein movable contact 36 is closed to stationary contacts 38 and 39 when the torque applied to the ignition key is released.

Operating coil 16 of solenoid operated switch 15 is connected across the source of direct current supply potential through the movable contact 27 and stationary contact 28 of electric relay 25. This energizing circuit may be traced from the positive polarity terminal of battery 2, through leads 46 and 47, movable contact 27 and stationary contact 28 of electric relay 25, lead 48, operating coil 16, lead 49, the armature of cranking motor 3 and point of reference or ground potential 5 to the negative polarity terminal of battery 2. "Hold-in" coil 19 of solenoid operated switch 15 is also connected across battery 2 through the contacts of electric relay 25 and point of reference or ground potential 5.

The control electrode and a selected one of the current carrying electrodes of transistor 10 are connected across the source of direct current supply potential through the anode-cathode electrodes of silicon controlled rectifier 30. This circuit may be traced from the positive polarity terminal of battery 2, through lead 34, movable contact 36 and stationary contact 37 of electric switch 35, lead 45, current limiting resistor 54, the anode electrode 31 and cathode electrode 32 of silicon controlled rectifier 30, base resistor 55, the base electrode 11 and emitter electrode 13 of transistor 10 and point of reference or ground potential 5 to the negative polarity terminal of battery 2.

To provide for the automatic deenergization of electric cranking motor 3 upon the start of engine 4 with the circuit of this invention, an electrical control potential of a magnitude which increases with the speed of the cranked engine is provided. One method of providing the required electrical control potential is a small direct current generator, schematically represented in the FIGURE and referenced by the numeral 56, having an armature rotated by the shaft of the armature of cranking motor 3. A small alternating current generator having a rotor rotated by the shaft of the armature of cranking motor 3 may also be employed as the source of electrical control potential. To provide the direct current potential power for charging the storage battery with most applications, the engine drives a direct current generator or an alternator, the output of which is rectified. In the FIGURE, the battery charging generator driven by engine 4 is schematically represented and referenced by the numeral 8. These generators also produce an electrical potential of a magnitude which, up to a point as determined by the associated potential regulator, increases with the speed of the cranked engine. It is to be specifically understood that the electrical control potential may be at least a portion of the output of the battery charging generator driven by the cranked engine without departing from the spirit of the invention. However, the use of a small electrical generator, the armature or rotor of which is driven by the armature of the cranking motor, eliminates the necessity of electrical wiring between the circuit of this invention, which may be mounted upon or adjacent the cranking motor, and the output terminals of the battery charging generator.

The anode electrode 41 and cathode electrode 42 of silicon controlled rectifier 40 are connected in shunt across a control electrode and a selected one of the current carrying electrodes of transistor 10 between junction 57 and point of reference or ground potential 5 and the electrical control potential is applied across the gate-cathode electrodes of silicon controlled rectifier 40. In the circuit as set forth in the FIGURE, the output terminals of generator 56 are connected across the gate electrode 43 and the cathode electrode 42 of silicon controlled rectifier 40 through current limiting resistor 58 and point of reference or ground potential 5, respectively. Should at least a portion of the output potential of the battery charging generator driven by engine 4 be employed as the direct current control potential with the circuit of this invention, this potential would be applied across the gate-cathode electrodes of silicon controlled rectifier 40.

The current carrying electrodes of transistor 20 are connected across the source of direct current supply potential through a circuit which may be traced from a positive polarity terminal of battery 2, through lead 34, movable contact 36 and stationary contact 37 of electric switch 35, lead 45, collector resistor 59, the collector electrode 22 and emitter electrode 23 of transistor 20 and point of reference or ground potential 5 to the negative polarity terminal of battery 2.

The gate electrode 33 of silicon controlled rectifier 30 is connected to junction 62 between collector resistor 59 and collector electrode 22 of transistor 20 through isolating diode 63.

To provide the lockout feature which prevents the energization of cranking motor 3 while engine 4 is in the running mode, provision is made for producing an alternating current potential signal in response to engine "start". To produce this alternating current potential signal, a vibration transducer 75 of the type which produces an alternating current potential signal in response to the vibration thereof may be mounted upon engine 4 or, alternatively, upon cranking motor 3. Vibration transducers of this type are commercially available from the Sonotone Company of Elmsford, New York. Consequently, this device has been indicated in the FIGURE in block form.

The alternating current output potential produced by vibration transducer 75 upon engine 4 "start" is amplified by a conventional alternating current amplifier, illustrated in the FIGURE as transistors 50 and 60 connected in a Darlington pair configuration and the associated circuitry. While electric switch 35 is in the "crank" or "run" position, the series-parallel combination of collector resistor 65, the collector-emitter electrodes of transistors 50 and 60 in parallel and emitter resistor 66 and the series combination of resistors 67 and 68 and temperature compensating diode 69 are connected in parallel across the source of direct current supply potential through lead 34, movable contact 36 and stationary contact 38 of electric switch 35 and lead 64 and point of reference or ground potential 5. Base electrode 51 of transistor 50 is connected to junction 74 between resistors 67 and 68. The amplified alternating current signal produced by vibration transducer 75 may be taken from junction 76 between collector resistor 65 and the collector electrodes of transistors 50 and 60 and applied to the base electrode 71 of type PNP-transistor 70 through coupling capacitor 77. Although the circuit for amplifying the alternating current output of vibration transducer 75 is illustrated in the FIGURE as two type NPN-transistor 50 and 60 connected in Darlington pair, any other suitable alternating current amplifying arrangement may be employed without departing from the spirit of the invention.

The alternating current potential signal produced by vibration transducer 75 is converted into a series of square wave form potential signals by type NPN-transistor 70, in a manner to be explained later in this specification, which may be taken from junction 79 between collector electrode 72 of transistor 70 and capacitor 80 and applied across the control electrode and a selected one of the current carrying electrodes of transistor 20, base electrode 21 and emitter electrode 23, through lead 81, connected between junction 79 and base electrode 21 of transistor 20, and point of reference or ground potential 5, respectively.

Upon the closure of movable contact 36 of electrical switch 35 to the "crank" position at which it is in electrical contact with stationary contacts 37 and 38, supply potential appears across leads 45 and 64, connected to the positive polarity terminal of battery 2 through respective stationary contacts 37 and 38 and movable contact 36 of electric switch 35 and lead 34, and point of reference or ground potential 5 of a positive and a negative polarity, respectively. As the engine is at rest, vibration transducer 75 does not produce an alternating current output signal, consequently, the square wave form potential signals produced by transistor 70 in a manner to be explained in detail later in this specification do not appear across junction 79 and point of reference or ground potential 5. In the absence of these signals, there is no potential available to produce base-emitter current through type NPN-transistor 20, consequently, this device does not conduct. With transistor 20 not conductive, supply potential is applied across the gate electrode 33 and cathode electrode 32 of silicon controlled rectifier 30 through resistor 59 and diode 63 and point of reference or ground potential 5, respectively, in the proper polarity relationship to produce gate-cathode current through a silicon controlled rectifier to trigger silicon controlled rectifier 30 conductive through the anode-cathode electrodes. With silicon controlled rectifier 30 conducting through the anode-cathode electrodes, supply potential is applied across the base-emitter electrodes of type NPN-transistor 10 in the proper polarity relationship to produce base-emitter current flow through a type NPN-transistor from the positive polarity terminal of battery 2, through lead 34, movable contact 36 and stationary contact 37 of electric switch 35, lead 45, resistor 54, the anode-cathode electrodes of silicon controlled rectifier 30, resistor 55, the base-emitter electrodes of transistor 10 and point of reference or ground potential 5 to the negative polarity terminal of battery 2. This flow of base-emitter current through type NPN-transistor 10 triggers this device conductive through the collector-emitter electrodes to establish an energizing circuit for the flow of energizing current through operating coil 26 of relay 25 from the positive polarity terminal of battery 2, through lead 34, movable contact 36 and stationary contact 37 of electric switch 35, lead 45, operating coil 26 of relay 25, the collector-emitter electrodes of transistor 10, and point of reference or ground potential 5 to the negative polarity terminal of battery 2. Energized operating coil 26 of relay 25 operates movable contact 27 into electrical contact with stationary contact 28 to complete an energizing circuit for operating coil 16 of solenoid operated switch 15 through a circuit which may be traced from the positive polarity terminal of battery 2, through leads 46 and 47, movable contact 27 and stationary contact 28 of relay 25, lead 48, operating coil 16, lead 49, the armature of cranking motor 3 and point of reference or ground potential 5 to the negative polarity terminal of battery 2. "Hold-in" coil 19 is also energized through this circuit. Upon the energization of operating coil 16 of solenoid operated switch 15, movable contact 17 thereof is operated into electrical contact with stationary contact 18 to complete an energizing circuit for cranking motor 3 which may be traced from the positive polarity terminal of battery 2, through lead 46, movable contact 17 and stationary contact 18 of solenoid operated switch 15, lead 49, the armature of cranking motor 3 and point of reference or ground potential 5 to the negative polarity terminal of battery 2 and cranking motor 3 begins to crank engine 4. Upon the closure of movable contact 17 of solenoid operated switch 15 to stationary contact 18, operating coil 16 is "short-circuited" thereby and, consequently, deenergizes. However, "hold-in" coil 19 remains energized to maintain movable contact 17 in electrical contact with stationary contact 18 to maintain the energizing circuit for cranking motor 3.

Upon engine 4 "start", the armature of cranking motor 3 is driven by engine 4 at a speed proportional to the speed of engine 4. As the armature or rotor of electrical generator 56 is driven by the armature of cranking motor 3, the output control potential of electrical generator 56 increases in magnitude with the speed of cranked engine 4 and is applied across the gate-cathode electrodes of silicon controlled rectifier 40, through a circuit previously described. When engine 4 has reached a speed which will drive the armature of cranking motor 3 and, consequently, the armature or rotor of electrical generator 56 at a speed great enough to produce an electrical generator 56 output control potential of a magnitude sufficiently great to produce gate-cathode current flow through silicon controlled rectifier 40, this device conducts through the anode-cathode electrodes thereof to shunt base current from type NPN-transistor 10. With base current shunted therefrom, transistor 10 extinguishes to interrupt the energizing circuit for operating coil 26 of relay 25 which, in turn, interrupts the energizing circuit for operating coil 16 of solenoid operated switch 15 and also "hold-in" coil 19. Consequently, movable contact 17 moves out of electrical contact with stationary contact 18 to automatically disconnect cranking motor 3 from battery 2 upon engine 4 start even though electrical switch 35 is held in the "crank" position.

So long as movable contact 36 of electrical switch 35 is maintained in electrical contact with stationary contact 37, silicon controlled rectifiers 30 and 40 remain conductive through the respective anode-cathode electrodes to maintain the energizing circuit for the operating coil 16 of solenoid operated switch 15 interrupted.

After engine 4 has started and is in the running mode with electric switch 35 in the "run" position, the circuit through which anode-cathode current is supplied to silicon controlled rectifiers 30 and 40 is interrupted thereby, consequently, silicon controlled rectifiers 30 and 40 extinguish. With silicon controlled rectifier 40 extinguished, the energizing circuit for cranking motor 3 would be established should electric switch 35 be inadvertently operated to the "crank" position even though engine 4 is in the running mode.

The lockout feature of the circuit of this invention, provided by vibration transducer 75, amplifying transistors 50 and 60 and transistors 20 and 70 and the associated circuitry, prevents the energization of cranking motor 3 while engine 4 is in the running mode even though electric switch 35 may be inadvertently operated to the "crank" position.

Upon the operation of electric switch 35 to the "run" position with movable contact 36 in electrical contact with stationary contacts 38 and 39, supply potential appears across lead 64 and point of reference or ground potential 5 of a positive and a negative polarity, respectively, as lead 64 is connected to the positive polarity terminal of battery 2 through stationary contact 38 and movable contact 36 of electric switch 35 and lead 34.

Series resistors 67 and 68 are so proportioned that the alternating current signal produced by vibration transducer 75 while the engine 4 is in the running mode will extinguish transistors 50 and 60 over those half cycles during which the output terminal thereof connected to junction 74 is of a negative polarity. Consequently, transistors 50 and 60 are conductive only over those half cycles of the alternating current signals produced by vibration transducer 75 during which the output terminal thereof connected to junction 74 is of a positive polarity. While transistors 50 and 60 conduct, transistor 70 conducts through the emitter-collector electrodes until coupling capacitor 77 has become charged, at which time transistor 70 extinguishes. Transistor 70 remains extinguished while transistors 50 and 60 are conductive through the collector-emitter electrodes, the base electrode 71 being maintained at substantially the same potential as emitter electrode 73 by resistor 86. When transistors 50 and 60 extinguish during alternate half cycles, capacitor 77 discharges through resistors 65 and 86. Consequently, the potential appearing across junction 79 and point of reference or ground potential 5 while engine 4 is in the running mode is a series of square wave form signals of a frequency equal to the frequency of the alternating current signal produced by vibration transducer 75. These square wave form signals are smoothed by capacitor 80 and are applied across the base-emitter electrodes of type NPN-transistor through lead 81 and point of reference or ground potential 5, respectively, in the proper polarity relationship to produce base-emitter current flow through a type NPN-transistor. Should electric switch 35 be inadvertently operated to the "crank" position, supply potential is applied across the collector-emitter electrodes of transistor 20 through lead 34, movable contact 36 and stationary contact 37 of electrical switch 35, lead 45, collector resistor 59, the collector-emitter electrodes of transistor 20 and point of reference or ground potential 5, respectively. Consequently, transistor 20 would conduct through the collector-emitter electrodes and shunt gate current from silicon controlled rectifier 30. With gate current shunted from silicon controlled rectifier 30, this device is not triggered conductive through the anode-cathode electrodes to complete the circuit through which base-emitter current is supplied to transistor 10. As transistor 10 is not triggered conductive through the collector-emitter electrodes, the energizing circuits for operating coil 26 of relay 25 and operating coil 16 of solenoid operating switch 15 are not completed.

Diode 82 connected across operating coil 26 of relay 25 is provided for the purpose of dissipating the energy of coil 26 upon the interruption of the energizing circuit. The series combination of resistor 83 and thermistor 84 may be included for purposes of temperature compensation.

Specific electrical switching devices, transistor types and electrical polarities have been set forth in this specification. However, it is to be specifically understood that alternate electrical switching devices possessing similar characteristics and alternate transistor types and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electric cranking motor automatic disconnect and lockout circuit comprising in combination with a source of direct current supply potential, an electric cranking motor connected thereacross through the normally open contacts of a solenoid operated switch having at least one operating coil and an associated engine cranked thereby, an electric relay having an operating coil, a movable contact and a stationary contact, a first transistor having a control electrode and two current carrying electrodes, means for connecting said operating coil of said electric relay across said source of direct current supply potential through said current carrying electrodes of said first transistor, means for connecting said operating coil of said solenoid operated switch across said source of direct current supply potential through said movable contact and said stationary contact of said electric relay, a first silicon controlled rectifier having anode, cathode and gate electrodes, means for connecting said control electrode and a selected one of said current carrying electrodes of said first transistor across said source of direct current supply potential through said anode-cathode electrodes of said first silicon controlled rectifier, a second silicon controlled rectifier having anode, cathode, and gate electrodes, means for producing a control potential of a magnitude which increases with the speed of the cranked engine, means for connecting said anode-cathode electrodes of said second silicon controlled rectifier in shunt across said control electrode and a selected one of said current carrying electrodes of said first transistor, means for applying said control potential across said gate-cathode electrodes of said second silicon controlled rectifier, a second transistor having a control and two current carrying electrodes, a resistor, means for connecting said current carrying electrodes of said second transistor and said resistor in series across said source of direct current supply potential, means for connecting said gate electrode of said first silicon controlled rectifier to the junction between said resistor and said current carrying electrodes of said second transistor, means for producing an alternating current potential signal in response to engine start, means for converting said alternating current potential signal to a series of square waveform potential signals, and means for applying said square waveform potential signals across said control electrode and a selected one of said current carrying electrodes of said second transistor.

2. An electric cranking motor automatic disconnect and lockout circuit comprising in combination with a source of direct current supply potential, an electric cranking motor connected thereacross through the normally open contacts of a solenoid operated switch having at least one operating coil and an associated engine cranked thereby, an electric relay having an operating coil, a movable contact and a stationary contact, a first transistor having base, collector and emitter electrodes, means for connecting said operating coil of said electric relay across said source of direct current supply potential through said collector-emitter electrodes of said first transistor, means for connecting said operating coil of said solenoid operated switch across said source of direct current supply potential through said movable contact and said stationary contact of said electric relay, a first silicon controlled rectifier having anode, cathode and gate electrodes, means for connecting said base-emitter electrodes of said first transistor across said source of direct current supply potential through said anode-cathode electrodes of said first silicon controlled rectifier, a second silicon controlled rectifier having anode, cathode, and gate electrodes, means for producing a control potential of a magnitude which increases with the speed of the cranked engine, means for connecting said anode-cathode electrodes of said second silicon controlled rectifier in shunt across said base-emitter electrodes of said first transistor, means for applying said control potential across said gate-cathode electrodes of said second silicon controlled rectifier, a second transistor having base, collector and emitter electrodes, a resistor, means for connecting said collector-emitter electrodes of said second transistor and said resistor in series across said source of direct current supply potential, means for connecting said gate electrode of said first silicon controlled rectifier to the junction between said resistor and said collector-emitter electrodes of said second transistor, means for producing an alternating current potential signal in response to engine start, means for converting said alternating current potential signal to a series of square waveform potential signals, and means for applying said square waveform potential signals across said base-emitter electrodes of said second transistor.

3. An electric cranking motor automatic disconnect and lockout circuit comprising in combination with a source of direct current supply potential, an electric cranking motor connected thereacross through the normally open contacts of a solenoid operated switch having at least one operating coil and an associated engine cranked thereby, an electric relay having an operating coil, a movable contact and a stationary contact, a first transistor having base, collector and emitter electrodes, means for connecting said operating coil of said electric relay across said source of direct current supply potential through said collector-emitter electrodes of said first transistor, means for connecting said operating coil of said solenoid operated switch across said source of direct current supply potential through said movable contact and said stationary contact of said electric relay, a first silicon controlled rectifier having anode, cathode and gate electrodes, means for connecting said base-emitter electrodes of said first transistor across said source of direct current supply potential through said anode-cathode electrodes of said first silicon controlled rectifier, a second silicon controlled rectifier having anode, cathode, and gate electrodes, an electrical generator having an armature driven by said cranking motor and output terminals, means for connecting said anode-cathode electrodes of said second silicon controlled rectifier in shunt across said base-emitter electrodes of said first transistor, means for connecting said gate-cathode electrodes of said second silicon controlled rectifier across said output terminals of said electrical generator, a second transistor having base, collector and emitter electrodes, a resistor, means for connecting said collector-emitter electrodes of said second transistor and said resistor in series across said source of direct current supply potential, means for connecting said gate electrode of said first silicon controlled rectifier to the junction between said resistor and said collector-emitter electrodes of said second transistor, means for producing an alternating current potential signal in response to engine start, means for converting said alternating current potential signal to a series of square waveform potential signals, and means for applying said square waveform potential signals across said base-emitter electrodes of said second transistor.

4. An electric cranking motor automatic disconnect and lockout circuit comprising in combination with a source of direct current supply potential, an electric cranking motor connected thereacross through the normally open contacts of a solenoid operated switch having at least one operating coil and an associated engine cranked thereby, an electric relay having an operating coil, a movable contact and a stationary contact, a first transistor having base, collector and emitter electrodes, means for connecting said operating coil of said electric relay across said source of direct current supply potential through said collector-emitter electrodes of said first transistor, means for connecting said operating coil of said solenoid operated switch across said source of direct current supply potential through said movable contact and said stationary contact of said electric relay, a first silicon controlled rectifier having anode, cathode and gate electrodes, means for connecting said base-emitter electrodes of said first transistor across said source of direct current supply potential through said anode-cathode electrodes of said first silicon controlled rectifier, a second silicon controlled rectifier having anode, cathode, and gate electrodes, an electrical generator having an armature driven by said cranking motor and output terminals, means for connecting said anode-cathode electrodes of said second silicon controlled rectifier in shunt across said base-emitter electrodes of said first transistor, means for connecting said gate-cathode electrodes of said second silicon controlled rectifier across said output terminals of said electrical generator, a second transistor having base, collector and emitter electrodes, a resistor, means for connecting said collector-emitter electrodes of said second transistor and said resistor in series across said source of direct current supply potential, means for connecting said gate electrode of said first silicon controlled rectifier to the junction between said resistor and said collector-emitter electrodes of said second transistor, a vibration transducer mounted upon said associated cranked engine for producing an alternating current potential signal in response to engine start, means for converting said alternating current potential signal to a series of square waveform potential signals, and means for applying said square waveform potential signals across said base-emitter electrodes of said second transistor.

* * * * *